Jan. 30, 1934.  V. G. APPLE  1,944,869
METHOD OF AND APPARATUS FOR MAKING COMMUTATORS
Filed Nov. 19, 1928  2 Sheets-Sheet 1
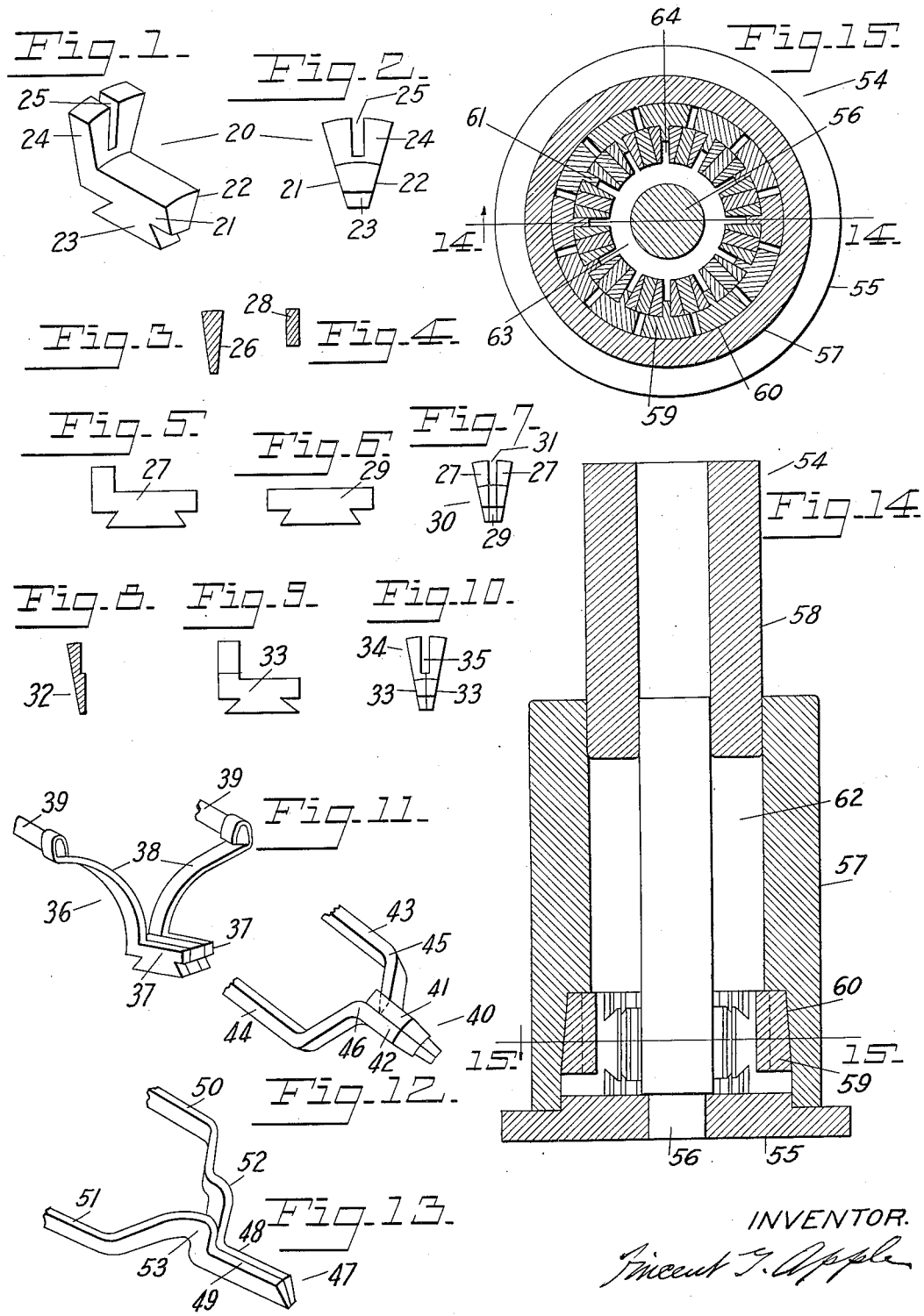
INVENTOR.
Vincent G. Apple

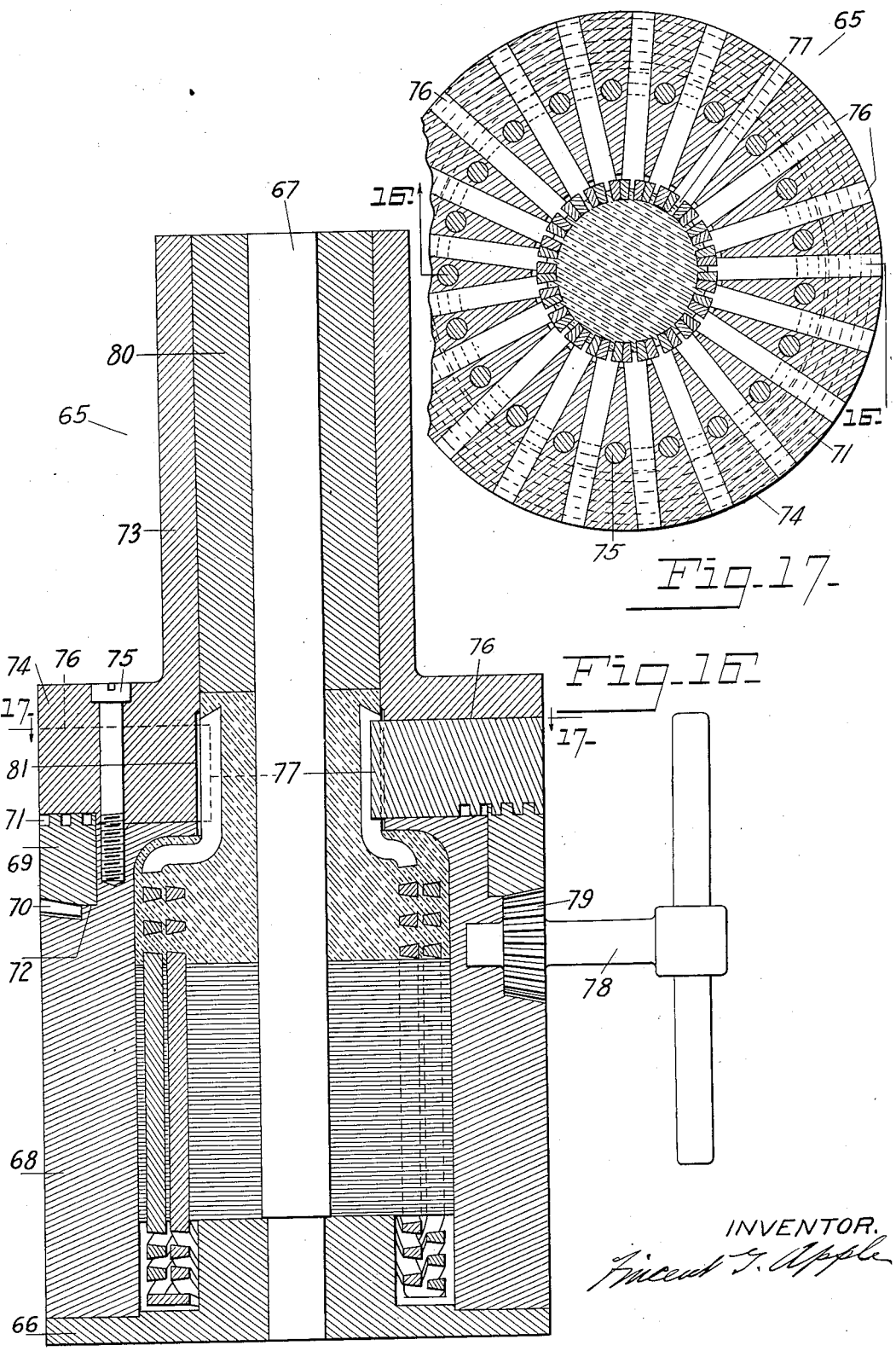

Patented Jan. 30, 1934

1,944,869

UNITED STATES PATENT OFFICE 1,944,869

METHOD OF AND APPARATUS FOR MAKING COMMUTATORS

Vincent G. Apple, Dayton, Ohio; Herbert F. Apple, Edward M. Apple, and Gourley Darroch, executors of said Vincent G. Apple, deceased Application November 19, 1928
Serial No. 320,338

4 Claims. (Cl. 18—42)

This invention relates to commutators, and particularly to those comprising a plurality of segments of conductive material held in spaced relation by a core of insulation molded between and about them.

The object of the invention is to provide a method of procedure which greatly facilitates the making of a commutator of this class.

I attain this object by the procedure hereinafter described and illustrated by the accompanying drawings wherein:—

Fig. 1 is a perspective view of a conventional commutator segment.

Fig. 2 is an end view of the segment shown in Fig. 1.

Figs. 3 and 4 are transverse sections thru bars used in making a laminated segment.

Fig. 5 is a punching taken from stock Fig. 3.

Fig. 6 is a punching taken from stock Fig. 4.

Fig. 7 is an end view of a laminated segment comprising two punchings Fig. 5 and one punching Fig. 6.

Fig. 8 is a transverse section thru stock from which segment Fig. 10 is made.

Fig. 9 is a punching taken from stock Fig. 8.

Fig. 10 is an end view of a segment composed of two punchings Fig. 9.

Fig. 11 shows a type of laminated segment wherein two of the laminæ are extended and used as winding leads.

Fig. 12 shows a commutator segment composed of two enlarged ends of conductor bars.

Fig. 13 shows a commutator segment composed of appropriately bent ends of conductor bars.

Fig. 14 is a vertical sectional view, taken at 14—14 of Fig. 15 of a simple mold used in making my commutator.

Fig. 15 is a transverse section taken at 15—15 of Fig. 14.

Fig. 16 is a vertical section taken at 16—16 of Fig. 17, thru a mold of more complex form.

Fig. 17 is a transverse section taken at 17—17 of Fig. 16.

Similar numerals refer to similar parts thruout the several views.

The usual method pursued in making commutators of the class to which this invention belongs consists of assembling the copper segments in cylindrical formation with strips of sheet mica or similar insulation separating them one from another, confining the assembled structure in a mold and molding insulation about the ends of the segments to compose a commutator.

Another method known to the art consists of providing a cylindrical mold having imbedded in its inner wall and extending inwardly a short distance into the cavity, a series of metallic spacers between which the segments are placed while the insulation is being molded about them.

Now when the latter method is employed it is desirable that the metallic spacers extend inwardly between the segments as short a distance as possible, so that the insulation may extend outwardly from the core between the segments to hold them in spaced relation.

But when the metallic spacers extend inwardly from the mold wall such a short distance the segments are not well supported by them while molding is taking place, because if the circumferential distance betwen spacers is great enough to permit the segments to be readily assembled therebetween, the inner edges of the segments will be free to move about considerably and will therefore make contact one with another when molding is being effected, and this is particularly true when the segments are of considerable radial depth.

The manner in which I obviate the difficulty encountered when using a mold having metallic spacers of the character hereinbefore described is one of the features of this invention, and while the method hereinafter outlined is particularly applicable to commutators having laminated segments the difficulty hereinbefore set forth is met where solid as well as where laminated segments are used, but is readily overcome by my method in either case.

At 20 Figs. 1 and 2 is shown the ordinary solid commutator segment. The sides 21 and 22 are inclined to each other, a dovetail part 23 extends from the bottom for the core to surround and grip, and the riser 24 extends upwardly and has the notch 25 for receiving the armature conductor leads, all as in common practice.

Figs. 3 to 7 inclusive show a method frequently employed to produce a laminated segment. Bar stock of a wedge shaped cross-section as at 26 Fig. 3 is punched into commutator segment laminæ of an outline 27 Fig. 5, and bar stock of a rectangular cross section as at 28 Fig. 4 is punched into commutator segment laminæ of an outline 29 Fig. 6. Then two commutator segment laminæ 27 and one commutator segment lamina 29 are assembled as in Fig. 7 to compose a commutator segment 30.

The segment 30 is to all intents and purposes the same as segment 20 and is more easily made, because bar stock which is thick enough for the segment 20 is not readily punched to the outline shown without considerable deformation from the pressure required to cut thru the heavy bar, and while in segment 20 it is necessary to cut a terminal notch 25, a similar notch 31 in segment 30 is a natural part of the structure.

Figs. 8, 9 and 10 show another method extensively employed to make commutator segments. Bar stock of a cross section 32 Fig. 8 is punched into commutator segment laminæ of an outline 33 Fig. 9 and two such commutator segment laminæ are assembled to compose the segment 34 Fig. 10 which has the notch 35 and answers the purpose of the segment 20 besides being more readily produced because it may be made on a punch press.

Fig. 11 shows a laminated segment 36 wherein the two outer laminæ 37 extend upwardly as at 38 and are so spread apart as to connect two widely spaced apart bar conductors 39 of a winding, thereby serving the twofold purpose as riser and lead.

In Fig. 12 a segment 40 is provided by enlarging the ends 41 and 42 of conductor bars 43 and 44 and bringing them together by bending the bars at 45 and 46. In a completed armature an end 41 and an end 42 are held together in electrical contact and together they compose the segment 40. Since the conductor bars and their enlarged ends are integral no notch is required in the segment 40 to receive conductor bars.

In Fig. 13 a segment 47 is provided by merely appropriately bending the ends 48 and 49 of conductor bars 50 and 51 as at 52 and 53.

The commutator segments Figs. 1 to 13 and the methods employed in making them are not a part of this invention and are shown merely to illustrate various forms of segments which may be joined by my method to compose a commutator.

In Figs. 14 and 15 I show a simple mold 54 which I may use to put my method into practice. This mold consists of a base 55 carrying a central core 56, a cylinder 57 concentrically supported on base 55, a plunger 58 slidable into cylinder 57 and over core 56, and a ring divided into a plurality of jaws 59 with axially tapering edges 60 adapted to be surrounded by a correspondingly tapered opening in the lower end of cylinder 57.

To make a commutator with this mold 54 I assemble in cylindrical arrangement a plurality of segments 30, (see Fig. 7) each composed of two parts 27 and one part 29. Jaws 59 are next placed so as to form a ring around the segments with their spacing tangs 61 extending between, then cylinder 57 is forced downward over the assembly as shown in Fig. 14.

The segments 30, jaws 59, spacing tangs 61, edges 60 and the tapered opening in the lower end of cylinder 57 so correspond that when the cylinder is forced to the position shown each three-part segment is clamped circumferentially at its two sides between two spacing tangs 61 and radially at its outer edge by portions of two jaws 59, so that each segment is gripped firmly as in a vise whereby relative movement of the segments is prevented when insulation is afterward molded about them.

After the segments are gripped, as shown in Figs. 14 and 15, a quantity of unmolded insulation is placed into space 62 and plunger 58 is forced downward to compact the insulation about the ends of the segments, into the space 63 (see Fig. 15) and outwardly between the segments into spaces 64 until it meets the ends of the spacing tangs 61.

In Figs. 16 and 17, I show a somewhat more complex mold 65 for binding together a plurality of segments of the character shown at 47 Fig. 13. As these segments are integral ends of the winding bars the mold is necessarily adapted to contain the entire armature. A base 66 carries a central core 67. A cylinder 68 is concentrically supported on base 66. A ring 69 is fitted to revolve freely about cylinder 68. In the lower side of ring 69 bevel gear teeth 70 are cut, while the upper end contains a spirally cut scroll 71. A plain shoulder 72 over which the teeth 70 do not extend limits downward axial movement of the ring. A cylinder 73 having a thick flange 74 at its lower end is fastened by screws 75 to the top of cylinder 68. The thick flange 74 has cut in its lower side a series of radially extending grooves each of which contains a jaw 76 having a spacing tang 77 at its inner ends and scroll teeth adapted to mesh with scroll 70 of ring 68 in its lower edge. A hand wrench 78 carries pinion 79 adapted to mesh with teeth 70 of ring 69 to revolve the ring and by means of the scroll 71 to move jaws 76 radially inward or outward, depending on the direction in which the wrench 78 is turned. A plunger 80 is slidable into cylinder 73 and over central core 67. The mold operates as follows:

With plunger 80 removd from the mold body and the mold body removed from base 66 an armature wound with bars having the ends bent and paired to compose segments 47 Fig. 13 is placed over central stud 67. With wrench 78 jaws 76 are moved slightly in a radially outward direction and the mold body is then placed over the armature on to the base 66 with spacing tangs 77 extending slightly between segments. A clearance space 81 permits the segments to spring radially outward slightly to increase the space between them and allow spacing tangs 77 to enter freely.

Wrench 78 is now turned to move jaws 76 radially inward to clamp the two halves of each segment tightly together as in a vise. A proper quantity of unmolded insulation is then put into cylinder 73 and with plunger 80 is compacted and hardened between and about the segments to compose a commutator and thru and about the winding to hold it rigid. When jaws 76 are withdrawn the armature and finished commutator are readily removed from the mold.

The advantages of the hereinbefore described method are apparent, for even for use with solid segments as shown at 20 Fig. 1 the segments are rigidly held so that their inner edges may not move about and make contact with each other while molding is being effected. But when laminated segments are employed the method is doubly advantageous, since by it a segment is not only held rigid and properly spaced apart but the laminæ composing it are clamped tightly together to maintain their electrical contact and prevent insulation entering between them while molding the core about them.

While in the foregoing I have shown but two different forms which my mold may take, it is apparent that it may be made in many other ways and still maintain the principle of my invention which consists of surrounding the commutator segments with a means capable of acting against their outer edges to move them radially inward to decrease the space between them and thus force them against the separating spacing tangs thereby clamping them at three edges while insulation is being molded about them, and it is readily conceivable that the clamping jaws may be moved by levers, gears, cams, or other mechanical means, or by pistons or rams pneumatically or hydraulically driven.

Having this conception of the scope of the invention, I claim—

1. The combination, in a mold for making commutators having an opening adapted to receive the segments of a commutator in cylindrical formation, of a plurality of radially movable jaws adapted to engage the outer edges of the segments, spacing tangs extending inwardly a short distance between adjacent segments, means to move said jaws inwardly to clamp said segments tightly between said spacing tangs, a cylinder communicating with said opening adapted to contain a quantity of unmolded insulating material, and a plunger to force said material between and about said segments.

2. A mold for making commutators, comprising in combination, a cylinder having a commutator chamber a plurality of circumferentially spaced apart radially movable jaws penetrating said cylinder and extending into said chamber, commutator segment spacing tangs at the inner ends of said jaws, means to simultaneously move said jaws in their respective radial directions, a cylinder adjacent said commutator chamber adapted to contain a quantity of unmolded insulating material, and a plunger adapted to force said material out of said cylinder and into said commutator chamber.

3. The method of making a commutator, which consists of placing a series of commutator segment laminæ circumferentially adjacent to compose a hollow cylinder, with the several laminæ of each segment together in electrical contact and the several laminated segments with equal vacant spaces between their adjacent sides, firmly gripping each individual segment at the outer edges of its two opposite sides and on its outer surface, thereby clamping the laminæ of each segment together tightly and holding the inner edges of said segments against movement, whereby the inner portion of said equal vacant spaces are kept vacant and equal, pressure molding a single mass of insulation to fill the hollow of said cylinder and said equal vacant spaces while the several laminæ of each segment are so clamped and the several segments are so held, hardening said mass, then releasing said grip on said segments.

4. The method of making a commutator comprising a plurality of segments each of which is made up of a plurality of layers, which consists of clamping the layers of each segment together at the outer edges, holding the clamped segments in circumferentially spaced apart relation, compressing mobile insulation about the unclamped inner edges of the layers of each segment, hardening the insulation to hold the inner edges of the layers clamped, then unclamping the outer edges.

VINCENT G. APPLE.